(12) United States Patent
Hönig

(10) Patent No.: US 10,789,966 B2
(45) Date of Patent: Sep. 29, 2020

(54) METHOD FOR EVALUATING A QUALITY OF VOICE ONSET OF A SPEAKER

(71) Applicant: Digithep GmbH, Berlin (DE)

(72) Inventor: Florian Hönig, Erlangen (DE)

(73) Assignee: Digithep GmbH, Berlin (DE)

( * ) Notice: Subject to any disclaimer, the term of this patent is extended or adjusted under 35 U.S.C. 154(b) by 80 days.

(21) Appl. No.: 15/686,057

(22) Filed: Aug. 24, 2017

(65) Prior Publication Data

US 2018/0061431 A1   Mar. 1, 2018

(30) Foreign Application Priority Data

Aug. 31, 2016   (EP) ..................... 16186498

(51) Int. Cl.
| | |
|---|---|
| *G10L 21/02* | (2013.01) |
| *G10L 25/21* | (2013.01) |
| *G10L 25/60* | (2013.01) |
| *G10L 25/66* | (2013.01) |
| *G10L 15/20* | (2006.01) |
| *G10L 21/0224* | (2013.01) |
| *G10L 21/0232* | (2013.01) |

(52) U.S. Cl.
CPC .......... *G10L 21/0205* (2013.01); *G10L 15/20* (2013.01); *G10L 21/0224* (2013.01); *G10L 21/0232* (2013.01); *G10L 25/21* (2013.01); *G10L 25/60* (2013.01); *G10L 25/66* (2013.01)

(58) Field of Classification Search
CPC ..... G10L 21/0205; G10L 25/21; G10L 25/60; G10L 21/0232; G10L 25/66; G10L 15/20; G10L 21/0224

USPC ........................................................ 704/233
See application file for complete search history.

(56) References Cited

U.S. PATENT DOCUMENTS

| 4,020,567 A | 5/1977 | Webster | |
|---|---|---|---|
| 2010/0112973 A1* | 5/2010 | Ruelke | ................ H04L 25/4902 |
| | | | 455/326 |
| 2012/0116772 A1* | 5/2012 | Jones | .................. G06F 19/3481 |
| | | | 704/270 |

(Continued)

OTHER PUBLICATIONS

Talkin, David; "A Robust Algorithm for Pitch Tracking (RAPT)"; Speech Coding and Synthesis; Chapter 14; 1995; p. 495-518.

(Continued)

*Primary Examiner* — Bharatkumar S Shah

(74) *Attorney, Agent, or Firm* — BakerHostetler

(57) ABSTRACT

In a method for evaluating the voice onset of a speaker, especially suited for treatment of a stuttering disorder, the analysis includes: a. determine a time of voice onset of the speaker; b. obtain a fundamental frequency at the time of voice onset; c. in a predetermined time interval, obtain the curve with respect to time of energy at the fundamental frequency; d. obtain the curve with respect to time of energy at at least one harmonic multiple of the fundamental frequency; and e. determine the temporal progression of the ratio of the energies obtained in steps c and d. A gentle voice onset is presumed if the energy ratio is initially dominated by the energy of the fundamental frequency, and only in the further course of the predetermined time interval in a time span of $\Delta t$ the energy ratio shifts in favor of the energy/ energies of the harmonic multiple(a) of the fundamental frequency.

25 Claims, 5 Drawing Sheets

(56) References Cited

U.S. PATENT DOCUMENTS

2017/0206915 A1* 7/2017 Prasad ................. G10L 25/63

OTHER PUBLICATIONS

Shue et al.; "Voicesauce: A Program for Voice Analysis"; Proceedings of the 17$^{th}$ Int'l Congress of Phonetic Sciences; Aug. 2011; p. 1846-1849.
Stevens et al.; "Obstruent Consonants"; Acoustic Phonetics—Chapter 8; 1998; p. 422-451.
Garellek, Marc; "The timing and sequencing of coarticulated nonmodal phonation in English and White Hmong"; Journal of Phonetics; vol. 40; 2012; p. 152-161.
Peters et al.; "Perceptual Judgment of Abruptness of Voice Onset in Vowels as a Function of the Amplitude Envelope"; Journal of Speech and Hearing Disorders; vol. 51; Nov. 1986; p. 299-308.
"Mel Filter Bank"; http://siggigue.github.io/pyfilterbank/melbank.html; Siegfried Gundert; © 2014; accessed Jun. 14, 20018; 4 pages.
Davis et al.; "Comparison of parametric representation for monosyllabic word recognition in continuously spoken sentences"; IEEE Transactions on Acoustics, Speech and Signal Processing; vol. 28 No. 4; 1980; p. 357-366.
"Probability Calibration"; http://scikit-learn.org/stable/modules/calibration.html; scikit-learn developers; © 2007-2007; accessed Jun. 14, 2018; 8 pages.
Mark Garellek; "The timing and sequencing of coarticulated nonmodal phonation in English and White Hmong"; Journal of Phonetics; vol. 40; 2012; p. 152-161.
Kenneth Stevens; "Acoustic Phonetics"; Chapter 8; p. 422-451.
Shue et al.; "Voicesauce: A Program for Voice Analysis"; Proceedings of the 17$^{th}$ Int'l Congress of Phonetic Sciences; vol. 3; Aug. 2011; p. 1846-1849.
David Talkin; "A Robust Algorithm for Pitch Tracking—RAPT"; Speech Coding and Synthesis; Chapter 14; 1995; 24 pages.

* cited by examiner

METHOD FOR EVALUATING A QUALITY OF VOICE ONSET OF A SPEAKER

CROSS REFERENCE TO RELATED APPLICATIONS

This application claims priority to European patent application number 16186498.8 filed Aug. 31, 2016, the contents of which is incorporated herein by reference in its entirety.

TECHNICAL FIELD

The present invention relates to a method for evaluating a quality of a voice onset of a speaker. It further relates to a data processing program for computerized automated evaluation of a quality of voice onset of a speaker and a computerized data processing device having such a data processing program. The present invention is especially suited for the treatment of stuttering disorder.

BACKGROUND

The evaluation of the quality of the voice onset, especially after a so-called hard or gentle voice onset, is important for speech training. This applies especially, but not exclusively, to speech training for stutterers, but also to the training of speech therapists, who must learn a deliberate voice onset. To further convey this capability, the evaluation of the quality of a voice onset is important, as it also is for example in the training of persons who work a great deal with their speech.

Stuttering is a speech disorder in which involuntary repetitions, prolongations, and blocks occur. Worldwide, around 1% of the population is affected. Stutterers suffer in significant part from social anxieties and exclusion. The speech disorder according to the present state of knowledge is considered incurable, but by means of speech exercises it can be managed quite well and its effects can be well suppressed. There is thus on the one hand a need to develop and to offer a suitable speech exercise program; from the commercial standpoint there is a considerable market for the corresponding services or products.

One widespread and successful approach to the method procedure is the speech technique approach. Here a new and altered speech mode is learned in which stutter events occur less often. One of the most prominent versions of these is Webster's "Precision Fluency Shaping Program" (PFSP), which was developed back in the early 1970s and was distinguished by gentle voice onsets, stretching of sounds, and attenuation and voicing of consonants.

One component of work with stutterers quite often is computer-supported feedback for pronunciation. A German adaptation of a PFSP program under the name of the Kasseler Stuttering Therapy (KST) has been established and found to be highly effective.

A core aspect of fluency shaping and related approaches is the gentle voice onset. Using this, blocks do not even occur. Gentle voice onsets are frequently used by stutterers intuitively in order to dispel blocks. With gentle voice onsets, tone production is formed through the glottis without a stop first having been formed by the glottis. In this way the voice begins gently and quietly. In contrast to this, a hard voice onset is characterized by a prior glottal stop, which then is cleared in the form of a plosive-like sound. These differences may be understood for example by comparison of the electroglottogram and speech signal or in high-speed videos of the glottis. Gentle voice onsets are in addition marked by the absence of laryngealization (creaky voice, that is, irregular low-frequency vocal chord vibrations).

Webster's Fluency Shaping and related methods such as KST use computerized automatic analysis of the speech signal in order to provide the subject with feedback on the voice onsets. Existing methods for the recognition of voice onsets and evaluation of the quality of same use the fact that the gentleness of onset normally is manifested in a gradual increase in sound intensity.

For example, Webster uses the progression of sound intensity over the first 100 ms of voice onset in order to achieve an automatic classification of a gentle or hard voice onset. Other authors also described the use of the sound level curve (i.e. its temporal evolution) of an utterance in order to automatically evaluate voice onsets. The corresponding descriptions may be found for example in U.S. Pat. No. 4,020,567.

Among a number of parameters that describe the sound level curve, the logarithm of the so-called rise time is identified as the best one (the term used by H. F. Peters et al. in "perceptual judgment of abruptness of voice insertion in vowels as a function of the amplitude envelope," Journal of Speech and Hearing Disorders, vol. 51, no. 4, pp. 299-308, 1986, the time between attainment of 10% and 90% of maximal sound level). Under the very controlled conditions of this study, this parameter correlates very well with the perceptive (gradual) estimate of gentleness of voice onset.

US 2012/0116772 A1 describes a client-server system for supporting general speech therapy. The speech of the patient is received on a mobile terminal device and is automatically analyzed. The speech signal is transmitted to a server in order to perform further automatic analyses and to give the therapist the opportunity to intervene in the therapy. The automatic analyses also include analysis of voice onset. Likewise, fluency shaping as a therapy approach for stuttering is mentioned. The extraction of acoustic parameters for automatic analysis is described very broadly and generically, however. For analysis of voice onsets, no further information is given as to how this is done and what parameters are used.

To the extent they are described in any detail, the systems from the prior art that are used for classification of the voice onset all resort solely to the sound level curve. This is problematic for two reasons.

First of all, a gentle and gradual sound level increase is neither sufficient nor necessary for a gentle voice onset. For example, a creaky voice onset can have such a sound level increase. Creakiness, however, is to be avoided in any case in fluency shaping.

On the other hand, a voice onset can be gentle and still rise quickly in sound level. Thus, the sound level is viewed as an insufficient or incomplete parameter for determining and classifying a voice onset as "gentle" or "not gentle."

Although taking into account only loudness is congruent with the usual helpful advice to produce gentle and gradually intensifying voice onsets, it is still problematic. Under very controlled conditions, parameters from the sound level curve may lead to success. But under realistic conditions, i.e. with non-prototypical voice onsets and with heterogeneous and/or cheaper and therefore less exact audio accessories, the classification task may be markedly more difficult and may not be precisely achieved solely by means of analysis of the sound level curve.

SUMMARY

Against this background, the object of the invention is a method for evaluating the quality of a voice onset in which in an automated process, especially computerized, gentle voice onsets of quite different speakers can be reliably recognized. In addition, a method based on such a method is to be provided for treatment of persons with speech disorders.

This object is achieved by a method for evaluating a quality of a voice onset of a speaker in accordance with the disclosed embodiments. A further aspect of the solution in addition lies in a data processing program with the features disclosed herein. Finally, the invention also provides a computerized data processing device.

In the method according to the invention for evaluating a quality of voice onset of a speaker, an acoustic speech signal of the speaker is accordingly recorded and converted to a digital speech signal. The digital speech signal is then analyzed in its temporal progression in order to a. in the temporal progression of the digital speech signal, determine the time of voice onset of the speaker, b. obtain a fundamental frequency of a speech signal at the time of voice onset, c. from the digital speech signal, in a predetermined time interval from the time of voice onset, extract the curve with respect to time of the energy contained in the speech signal at the fundamental frequency;

d. from the digital speech signal, in the predetermined time interval, obtain the curve with respect to time of the energy contained in the speech signal for at least one harmonic multiple of the fundamental frequency;

e. determine the temporal progression of the ratio of the energies obtained in steps c and d.

With recourse to the energies thus determined under c. and d. and their ratio determined under e., a gentle voice onset is presumed if in the time interval the ratio of energies obtained in e. is first dominated by the energy of the fundamental frequency, and only further on in the predetermined time interval in a time span of $\Delta t$ the ratio of energies shifts in favor of the harmonic multiple(s) of the fundamental frequency.

Here in other words, therefore, the focus is not on the sound level and its curve (and thus the energy) of the entire speech event during and after the voice onset, but there is a detailed consideration of different parts of the voice signal. Data recorded and evaluated by the inventors in fact showed that the sound level curve does not result in satisfactory reliability of classification of the desired behavior of gentle onset.

The method according to the invention now uses the realization acquired by the inventors that gentle onsets are above all distinguished by a special voice quality at the start of the speech event. Due to the fact that the amplitude of vibrations of the vocal cords in a gentle onset at first rises slowly, as the inventors recognized, initially in the speech signal chiefly the fundamental frequency is represented, while their harmonic multiples are scarcely present. The speech signal at the voice onset and in the first subsequent phase is approximately sinusoidal, as is shown in FIG. 1. Only when the vibrations of the vocal cords have reached their maximum is there a periodic vocal cord closure and thus the production of the normal voice with its strong proportions of harmonic multiples.

With a hard voice onset, on the other hand, the release of the prior glottis closure immediately initiates normal voice production with periodic glottal stops and the presence of harmonic multiples of the fundamental frequency. This is shown in FIG. 2. This aspect of voice quality is extracted using suitable acoustic parameters in accordance with the invention by means of the energy ratio of the oscillation components at the fundamental frequency to the oscillation components at the harmonic multiples over a predetermined time interval. For example, this aspect can be judged with reference to the ratio of energies of the first harmonic (thus the fundamental frequency) and the second harmonic multiples of the fundamental frequency measured in the first 10 ms after voice onset. Thus, within the scope of the invention it is not absolutely necessary to consider the energies of all harmonic multiples of the fundamental frequency. Since normally the lower-order harmonics oscillate with much more energy than the higher-order harmonics, it can suffice to concentrate solely on the lower-order harmonics, for example precisely on the second harmonic (doubled fundamental frequency).

Within the scope of the invention, a summation of energies in the range of $0.5*F_0$ to $1.5*F_0$ can be assumed to be the energy of the fundamental frequency $F_0$, in order to take into account a "blurring" of the frequency and of the energy contained therein. The energy thus obtained at the fundamental frequency can be related, for example, to that in a broad frequency band above the fundamental frequency (for example the energy in the range of 50 to 4,000 Hz), in order to characterize the voice onset then from the temporal development of this ratio.

For different examples, the following values of these energy ratios were obtained in experiments:

a. Ratio of the sampled frequency of the second harmonic to the fundamental frequency (decibels; averaged over the first 50 ms):

male speaker, prototypically gentle: e.g. 19.1 or −13.6; prototypically hard: e.g. 1.6 or 3.7 female speaker, prototypically gentle: e.g. −15.8 or −15.9; prototypically hard, e.g. 8.9 or 11.2 annotated database of patients recorded during exercises: gentle: −13.6 (average value) ±12.1 (standard deviation); hard: −3.2 (average value) ±15.7 (standard deviation)

It is clear that here a good distinction can be drawn between the gentle and hard voice onsets based on the energy ratio.

b. Ratio of summed energies from $0.5*F_0$ to $1.5*F_0$ to the rest in the frequency range of 50-4,000 Hz (decibels; obtained over the first 50 ms):

male speaker, prototypically soft: 10.6 or 9.8; prototypically hard −6.0 or −7.4 female speaker, prototypically gentle: 9.3 or 10.9; prototypically hard: 9.4 or −12.0 database: gentle: 7.0 (average value) ±9.9 (standard deviation); hard: −2.9 (average value) ±12.4 (standard deviation).

Here again, the differentiation that can be obtained by the method according to the invention from such consideration of the relevant energy ratios is plain to see.

In the method according to the invention, voice onsets must first be recognized in the signal curve of the digital speech signal, thus identified and localized in the temporal progression of the signal. To this end, the speech signal can advantageously be subdivided into voiced and unvoiced segments. Since the distinction between "voiced" and "voiceless" from local properties of the speech signal is inherently error-prone, it makes sense to use a method that takes advantage of global consistency conditions so as to arrive at a classification that is as robust as possible. This can be done for example using algorithms for extracting the curve of the fundamental frequency. First of all, only the "by-product" of the classification into voiced/voiceless segments is required.

Within the scope of the invention, to this end preferably the RAPT algorithm of David Talkin (cf. D. Talkin, *Speech Coding and Synthesis*, Elsevier Science, 1995, vol. 495, pp. 495-518, Ch. 14, *A Robust Algorithm for Pitch Tracking (RAPT)*) is used, which because of the lack of harmonic multiples for gentle voice onsets is better suited for precise segmentation than, for example, algorithms that operate in the frequency range.

In order to minimize the false alarms, the segmentation can be smoothed out even more using morphological operators as described e.g. by H. Niemann in *Klassifikation von Mustern* (Classification of Patterns), Springer Verlag 1983, 2nd Edition, available at http://www5.cs.fau.de/fileadmin/Persons/NiemannHeinrich/klassifikation-von-mustern/m00-www.pdf. Along with the time of the voice onset, the segmentation also gives the duration of the respective phrase.

The time interval in which—measured from the time of the voice onset—the energy curve with respect to time at the fundamental frequency (=first harmonic) and one or more harmonic multiples are determined, can in particular have a length of 7.5 to 200 ms, preferably of 50 to 100 ms.

A voice onset can be presumed in particular if the time span $\Delta t$, within which the energy ratio is shifted in favor of the energy for harmonic multiples of the fundamental frequency, is between 50 and 100 ms.

Determination of the fundamental frequency, just as in spectral analysis, can take place for example at intervals of 5 to 20 ms, in particular at intervals of 10 ms. Regular determination of the fundamental frequency is important, because it can and usually does change in the course of the voice onset, so the method must consider the correct fundamental frequency for precise analysis.

All in all, this method for detecting voice onsets constitutes a significant more robust process than methods based purely on the sound level, as is the case in the existing methods. A further advantage is that no calibration is necessary, whereas with methods based on sound level, a threshold value must always be set or estimated.

In the method according to the invention, the use of further relevant acoustic parameters and direct modeling of target behavior can also be applied. This can increase the great reliability already achieved by the above-described method even more.

Hereby various acoustic parameters in a plurality of variants can be derived and calculated from the digital speech signal in order to use all possibly relevant information in the speech signal and thus to achieve maximum robustness and reliability.

The mapping of the accordingly multidimensional parameter spaces onto the classes to be identified (gentle/hard voice onsets) then proceeds especially with the assistance of data-driven methods by means of an annotated database, typically a collection of voice onsets that were assessed and classified by experts. The method then operates entirely automatically. Further parameter groups that can be considered focus on the temporal development of the sound level (the only source of information considered in the prior art) and spectrum dominated parameters that are dedicated in particular to a consideration of the energies at various frequencies and thus indirectly also to voice quality. An exemplary process that also considers such parameters is described in more detail below.

Along with the invention, a data processing program is also provided for the computer-aided automated evaluation of quality of a voice onset of the speaker with a. a voice onset analysis module that is aimed at determining a time of the voice onset of the speaker from a temporal progression of a digital speech signal obtained from an acoustic speech signal of the speaker, b. a fundamental frequency detection module that is aimed at obtaining a fundamental frequency of the speech signal at the time of voice onset, c. a fundamental frequency-energy detection module that is aimed at obtaining from the digital speech signal in a predetermined time interval from the time of the voice onset the curve of the energy contained in a speech signal at the fundamental frequency, d. an overtone-energy detection module that is aimed at obtaining from the digital speech signal in the predetermined time interval the curve of the energy contained in the speech signal for harmonic mental frequency, e. a ratio determination module that is aimed at determining the temporal progression of the ratio of the energies obtained by the fundamental frequency energy detection module and the overtone-energy detection module, and to presume a gentle voice onset when in the time interval the ratio of energies initially is dominated by the energy of the fundamental frequency and only in the further course of the predetermined time interval ratio of energies shifts in favor of energies at harmonic multiples of the fundamental frequency.

With such a data processing program the above-described method can be carried out on computerized data processing devices. The data processing program can in particular and advantageously also contain a digitalization module to produce the digital speech signal from the acoustic speech signal. The voice onset module can advantageously use a RAPT algorithm according to David Talkin, as is specified more closely above, for determining the time of the voice onset. In particular the data processing program can be configured as an application software (so-called app) for a mobile terminal device such as in particular a smartphone or a tablet computer.

Furthermore, with the invention a computerized data processing device is provided that contains a data processing program as described above. The data processing program in this case is in particular installed on the data processing device. Advantageously the data processing device can have an input for receiving an acoustic speech signal. Such an input for example can be a microphone. Alternatively, however, a receiving component can also be connected to the data processing device, in which digitalization of the acoustic speech signal already takes place and then the digital speech signal is transmitted in high resolution to the data processing device (either cable connected or wireless, for example via an interface according to the Bluetooth standard). Such a receiver component can for example be formed by the microphone of the headset.

The data processing device can in particular be configured as a mobile terminal device, for example as a smartphone or tablet computer. The method according to the invention for treating persons with speech disorders, in particular stutterers, is marked by the following steps: A person to be treated is asked to speak a speech sample. This request can in particular be made by means of a computer device, such as in particular by a smartphone or a tablet computer, which is running an application software that carries out the method. The speech sample spoken by the person to be treated is recorded as an acoustic speech signal with a recording device, which can in particular be the computer device or can be connected to said device. The recorded acoustic speech signal is converted to a digital speech signal. The digital speech signal is automatically analyzed in its temporal progression, wherein in the temporal progression of the digital speech signal, a time of the voice onset of the speaker is determined and a fundamental frequency of the speech signal at the time of the voice onset is obtained; here from the digital speech signal in a predetermined time interval from the time of the voice onset, the curve with respect to time of the energy contained in the speech signal at the fundamental frequency is obtained. In this embodiment, from the digital speech signal in the predetermined time interval the curve with respect to time of the energy contained in the speech signal at at least one harmonic multiple of the fundamental signal is obtained. The temporal progression of the ratio of the energies obtained according to the above steps is determined; wherein a gentle voice onset is presumed if in the time interval the ratio of energies obtained in accordance with the above step is initially dominated by the energy of the fundamental frequency and only in the further course of the predetermined time interval in a time span $\Delta t$ the ratio of energies shifts in favor of the energy/energies at the harmonic multiples of the fundamental frequency. If according to this analysis of the speech sample the person to be treated is found to have a gentle voice onset, a positive feedback is sent to the person to be treated. Otherwise a negative feedback is sent to the person to be treated.

This treatment method can in particular be automated and be applied by the person with the speech disorder with assistance for example of a smartphone or tablet computer or some other computerized device with the corresponding recording function and application software for the described signal analysis without the person to be treating having to see a doctor or some other treatment provider and an office. Thus, the person to be treated, for example during a pause at work, can work through a treatment unit and thus achieve a treatment success and alleviation of the speech disorder. Persons who suffer from speech disorders can then practice much more frequently and complete the treatment units so that therapy success is more rapid and durable. Here a software can contain a treatment plan for example, which can be successively worked through by the person to be treated. For example, the speech samples can be in predetermined sentences and/or words, which are shown to the person to be treated on a screen, who must repeat them. This can also for example be individualized and be tailored to the specific fluency disorder of the person to be treated. Thus, for example, a therapist can establish a treatment plan and the corresponding speech samples and the order in which the person to be treated must work through them. It is therapeutically supportive that with mobile terminal devices used in the scope of the treatment it is possible for the first time to use a gentle voice onset in real life outside of the protected therapy space and thus allow the patient to practice, for in such situations, speech disorders and in particular disfluencies are especially pronounced.

In order for the person to be treated to score a treatment success, it can be provided that the results of the speech quality analyses are stored and are displayed to the person for example on a screen, for example in the graphic representation as a "success curve" with respect to time. Also it can be provided within the scope of the treatment that a data connection can be made between the treatment device used independently by the person to be treated and a central facility, over which the successes of the speech quality analyses can be transmitted to the central facilities for success monitoring. This can also then be carried out by a therapist who can again transmit data with a response, for example instructions for further actions in treatment to the person to be treated and the device used by him for treatment. This data connection can for example be formed in particular over the Internet. In particular when broadband data connections and in particular WLAN are available, video telephony can also be used, for example via the corresponding software applications such as Skype. This inclusion of video telephony can markedly simplify the therapeutic monitoring and the possibility of intervention by the therapist in a specific speech situation.

Analysis of the digital speech signal can also be further carried out within the scope of the treatment process in accordance with the above-described advantageous embodiments in the description of the method for evaluating speech quality.

Below—also with reference to the enclosed figures—embodiments of a method according to the invention for evaluation of speech quality, which is also a significant basis for the treatment of persons with speech disorders, is described and explained in more detail.

BRIEF DESCRIPTION OF THE DRAWINGS

FIG. 3c shows an analysis in accordance with different criteria than sound level and energy ratio of the fundamental frequency to the harmonic multiple/multiples and that also other parameters in the assessment can have an (additional) influence on quality of the analysis. Nonetheless FIG. 3b shows that the influence of the parameter "energy ratio of fundamental frequency to harmonic multiple/multiples" is especially pronounced and makes possible an especially good evaluation of the quality of the voice onset. The AUC (area under the curve; 0.5=random baseline, 1=perfect) is as follows: sound intensity (FIG. 3a): 0.424; 0.466; 0.525; 0.464; 0.403; fundamental frequency/harmonic multiple (FIG. 3b): 0.704; 0.688; 0.466; 0.792; 0.530; remainder (FIG. 3c); 0.634; 0.736; 0.512; 0.518 0.552.

DETAILED DESCRIPTION OF ILLUSTRATIVE EMBODIMENTS

Figure 1:
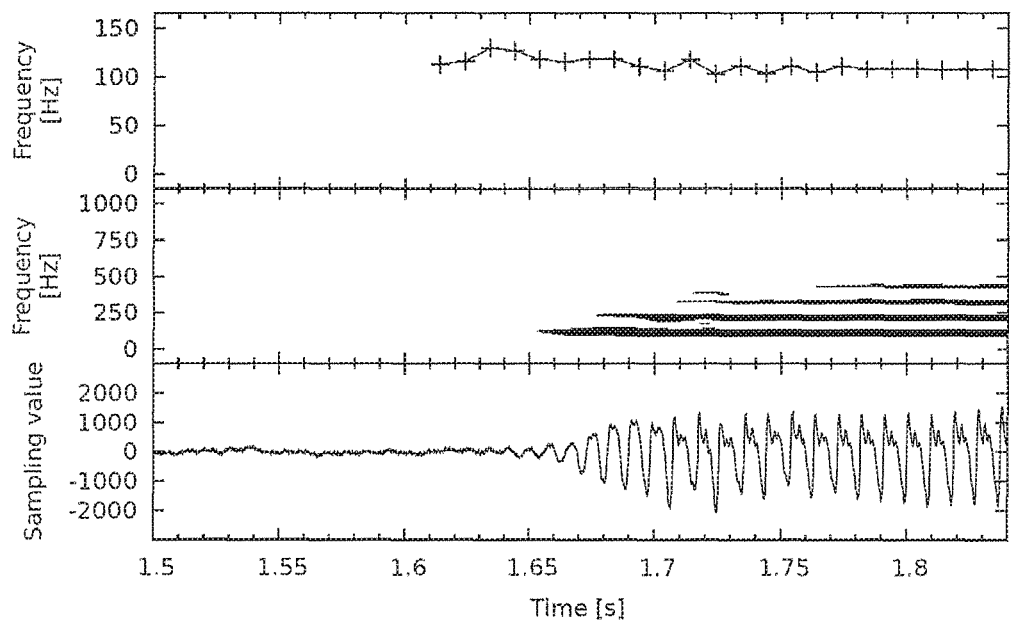
FIG. 1 is a voice analysis in the case of a gentle voice onset. Here in the top with the crosses connected by lines is the curve of the fundamental frequency extracted with the RAPT algorithm of David Talkin, wherein the curve of the fundamental frequency in addition gives the time of the voice onset at around $t=1.61$ seconds. The middle depiction is of a binarized spectrogram (pixels black if the intensity of a frequency at a respective time is greater than a threshold value, here 25 dB). The fundamental frequency and its harmonic multiples may be identified there as parallel horizontal lines. It can be seen that the lowermost line, which shows the fundamental frequency, is initially isolated and only in the further course (from around $t=1.68$ seconds) is accompanied by its harmonic multiples. In the bottom the speech signal per se is shown. At the start of the voice onset at around $t=1.65$ seconds, the speech signal is similar to a simple sine oscillation.
Figure 2:
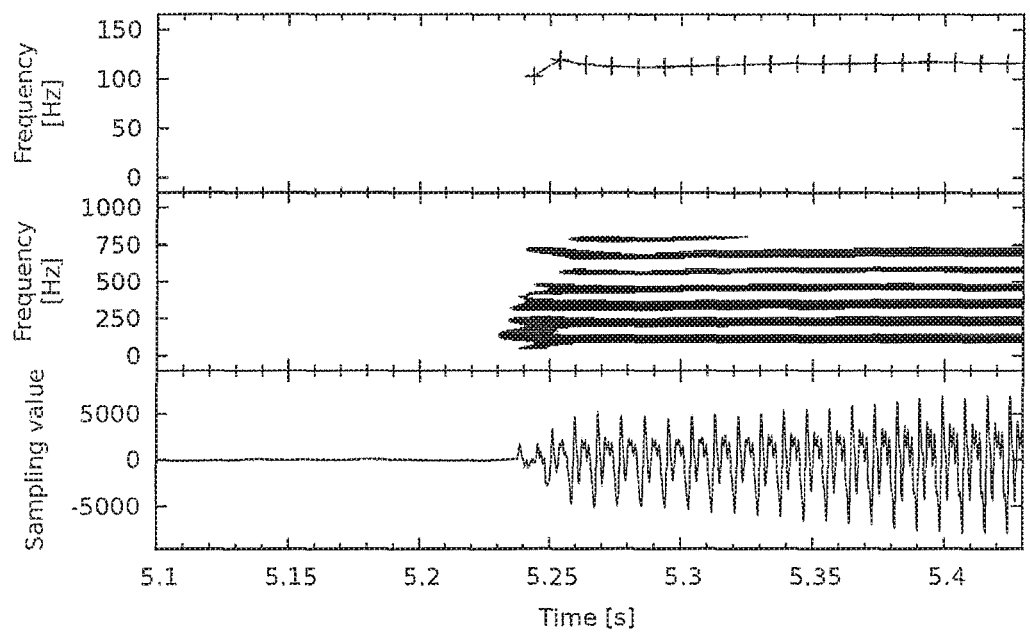
FIG. 2 is a depiction comparable with FIG. 1 with the depictions of the fundamental frequency curve according to the RAPT algorithm (top), spectrogram (center) and speech signal (bottom) for a voice analysis in the case of a hard voice onset. The time of the voice onset here is at around $t=5.24$ seconds. It can be seen in the spectrogram that here in contrast to the case in FIG. 1 of the gentle voice onset, the harmonic multiples set in practically simultaneously with the fundamental frequency. In addition, it can be seen in the speech signal that the complex (not just sinusoidal) oscillation sets in directly with the onset.

For the performance of a method according to the invention, in one embodiment variant one can proceed as described below.

1. Segmentation

Initially all voice onsets often an utterance are identified and localized. Toward this end the speech signal is subdivided into voiced and unvoiced segments. The RAPT algorithm of David Talkin is used for this purpose. Here it is assumed that the fundamental frequency is at least 50 Hz and at most 500 Hz. To minimize false alarms, the segmentation is further smoothed with the help of morphological operators (closure with 0.1 seconds, opening with 0.25 seconds, final closing with 0.5 seconds). Along with the time of the voice onset, segmentation also gives the duration of the respective phrase.

2. Feature Calculation 2.1. Base Features

Initially the properties of the speech signal are extracted which later on form the basis of several acoustic parameters. These are:

Sound Level:

For a short-term analysis window (length 40 ms, step size 10 ms, von-Hann window) the instantaneous sound level over the time from the (logarithmic) energy of the signal is calculated. Before this the average value of the signal is subtracted in order to compensate for a possible offset of cheaper and accordingly lower-quality recording hardware.

Pseudo-Period-Synchronous Sound Level:

In order to calculate the sound level of the speech signal as locally as possible (independently of adjacent, possibly significantly quieter or louder oscillation periods), the analysis window is adapted to the—preferably with the RAPT algorithm—extracted fundamental frequency (doubled period duration, von-Hann-window). Current fundamental frequency is $F_0$; then the duration of the analysis window is $2/F_0$. This corresponds at a sampling rate of the speech signal of $F_s$ (all speech signals are sampled down $F_s=16$ kH) to the following number of sampling values: rounded value of $2F_s/F_0$.

Short-Term Spectrum:

The (logarithmic) power spectral density is calculated from analysis windows with 25 ms width, 10 ms step size, and the von-Hann window.

The discrete Fourier transform (DFT) is calculated using the fast Fourier transform (FFT). In order to increase the frequency resolution, zero padding is used so that there are 2048 input values. Standard program libraries are used for the calculation.

Pseudo-Period-Synchronous Short-Term Spectrum:

For obtaining as local as possible a spectrum the analysis window is adjusted to the extracted fundamental frequency (fourfold period duration). Duration of the analysis window $4/F_0$, that is with the rounded value of $4F_s/F_0$ sampling values.

Short-Term Spectrum from Normalized Cross Correlation:

In order to calculate the frequency spectrum that exactly corresponds to the information that the preferably used RAPT algorithm used for extraction of the fundamental frequency, the frequency spectrum is directly calculated from the normalized cross correction. Here a method for calculating the short-term spectrum from the autocorrelation function is modified in that instead of the autocorrelation the normalized cross correlation is used. Thus, the power spectral density is calculated from the absolute value of the DFT of the cross correlation. This makes possible an especially precise calculation of the energy of the different harmonic multiples of the fundamental frequency. For the cross correlation as in the RAPT algorithm the window width is 7.5 ms and the total width corresponding to the minimal assumed fundamental frequency (50 Hz) is used. In order to increase the frequency resolution, zero filling is done before the DFT, so that there are 2048 input values.

2.2. Features

Below are listed the 908 calculated features (acoustic parameters that are used for classification) used for carrying out the method in the here described variant. It should be noted that not necessarily all of the listed features are required for success of the method. According to the invention however the focus is at least on properties related to "fundamental frequency/harmonic multiples." In one variant of the invention—which does not fall under the invention claimed here, but constitutes an independent invention—however other features can be used and combined without the feature "fundamental frequency/harmonic multiple."

Other features can be used but do not have to be. Here it is difficult to determine empirically which out of a given quantity of further features are actually necessary. Therefore in the pattern recognition it is normal to use many potentially relevant features, and to leave it to a data-driven method to carry out the weighting of the individual features. Experience shows that—assuming modern, robust classification methods—this leads to a more reliable classification system than the manual selection of a few promising parameters.

If intervals are spoken of below and time indications given in that regard, the time indication "0 ms" relates to the time of the voice onset obtained (with the RAPT algorithm).

Noise:

Calculation of most of the features is to a certain extent influenced by the background noise. In order to give the classification system the possibility of compensating for this, features are used that describe the sound level of the noise. The sound level of the noise is initially estimated as the minimum of the sound level, (after taking of the logarithm) smoothed with a 50-ms rectangular window. In order to achieve independence from the gain of the microphone, normalization is carried out with the estimated speech sound level calculated as the average value before or after taking of the logarithm, or as the median of the sound intensity in voiced segments. (This yields three features.)

Sound Level of the Onset:

The sound level during an interval at the start of onset is used as a feature in different variants. (Interval-lengths: 10 ms, 50 ms, 100 ms, or 200 ms; sound intensity: independent of voiced/unvoiced, only voiced or pseudo-period-synchronous; three different normalizations as above; this yields 4×3×3=36 features).

Sound Intensity of Direct Onset:

Sound intensity at the time of onset, in different variants (normalized with the three estimated speech sound intensities, or the sound intensity during the first 50 ms, 100 ms, or 200 ms; this yields six features).

Amplitude:

Sound intensity change during the entire phase (maximum/minimum, 99%/1% quantile, 95%/5% quantile, 90%/10% quantile; sound intensity: independent of voiced/voiced, only voiced or pseudo-period synchronous 4×3=12 features).

Local Amplitude:

Sound intensity change at the start of onset (intervals: 0 to 50 ms, 0 to 100 ms, 0 to 200 ms, 10 to 50 ms, 10 to 100 ms, 10 t 200 ms, 50 to 100 ms, 100 to 200 ms; sound intensity: independent of voiced/voiced, only voiced or pseudo-period synchronous; this yields 8×3=24 features).

Rise of Sound Intensity:

Rise of the regression lines at the start of onset (intervals and sound intensities as above; this yields 24 features).

Drop of Sound Level:

It is accumulated whether or how intensely the sound level drops locally at the start of onset (with a monotone rise, 0 results. Intervals: 50 ms, 100 ms, 200 ms; three different sound levels as above; yields 3×3=9 features).

Fundamental Frequency/Harmonic Multiple:

In order to form the decisive difference in the voice quality between gentle and hard onsets, the relative energy of the fundamental frequency is calculated in different variants. (Short-term spectrum, pseudo-period-synchronous short-term spectrum, or short-term spectrum from normalized cross correlation; calculation of the energy from a single frequency value (index of DFT coefficients: rounded value of $F_0 \times 2048/F_s$) or accumulated (symmetrical frequency interval, width=fundamental frequency: the absolute values of the DFT coefficients from the (rounded) index $0.5 \times F_0 \times 2048/F_s$ to (rounded) index $1.5 \times F_0 \times 2048/F_s$ before the taking of the logarithm are added); normalization by the energy of the 2nd harmonic multiples (calculation variant as with the fundamental frequency) or by the total energy in 50 to 4,000 Hz; intervals: 0 to 10 ms, 0 to 50 ms, 0 to 100 ms, 0 to 200 ms, 10 to 50 ms, 10 to 100 ms, 10 to 200 ms, entire phrase, 200 to phrase-end; accumulation: average or median, yield 3×2×2×9×2=216 features).

Fundamental Frequency:

So as to allow the classification system the possibility of compensating influences of the fundamental frequency, the average value and median of the (logarithmic) fundamental frequency are used (yield 2 features).

Variability of the Sound Level:

So as to characterize the creaky voice portions, different measures of the variability of the sound level are calculated (intervals: 0 to 50 ms, 0 to 100 ms, 0 to 200 ms, entire phrase, 200 ms to phrase end; sound level: only voiced or pseudo-period-synchronous; measure: standard deviation, error of the regression lines, paired variability index, average absolute acceleration; yield 5×2×4=40 features); for sound level independently of voiced/voiced the intercals −100 to 0 ms, 0 to 50 ms, 0 to 100 ms, 0 to 200 ms, entire phrase, 200 ms to phrase end; yield 6×4=24 features).

Variability Voiced/Voiceless:

Likewise for creaky voice portions, it is characterized how often the voice breaks off now and then, i.e. an unvoiced speech signal is present (proportion of voiced analysis windows over the intervals −100 to 0 ms, 0 to 50 ms, 0 to 100 ms, 0 to 200 ms, entire phrase, 200 ms to phrase end; yield 6 features).

Harmonicity:

For further characterization of the voice quality, measures of harmonicity are calculated (intervals 0 to 10 ms, 0 to 50 ms, 0 to 100 ms, 0 to 200 ms, entire phrase, 200 ms to phrase end; only counted if voiced; harmonicity from cross correlation c corresponding to the fundamental frequency: log $((c+0.1)/(1.0001-c))$; yield 6 features).

Spectral Features 1:

For further characterization of the voice quality or the spoken sound (phone), energies in frequency bands are added (24 mel-bands, logarithmic; normalized with average value (after taking of logarithm) over voiced segments; averaged over the intervals 0 to 10 ms, 0 to 50 ms, 0 to 100 ms, 0 to 200 ms, 10 to 50 ms, 10 to 100 ms, 10 to 200 ms; yield 24×7=168 features).

Mel bands are an intermediate result in the calculation of the standard speech recognition features, see below as well as for instance http://siggigue.github.io/pyfilterbank/melbank.html. They are (before taking the logarithm) summed up energies, weighted with triangle filters, which obey a auditory-perceptual scale.

Spectral Features 2:

For further characterization of the voice quality or the spoken sound, the standard short-term features of a speech recognition system (mel-frequency cepstral coefficients (MFCC, see S. B. Davis and P. Mermelstein, *Comparison of parametric representation for monosyllabic word recognition in continuously spoken sentences*, IEEE Transactions on Acoustics, Speech and Signal Processing, vol. 28, no. 4, pp. 357-366, 1980) are used; 13 MFCC from 24 mel bands; normalized with average value over voiced segments; intervals as above; yield 13×7=91 features).

Spectral Features 3:

Spectral features 1+2 at the immediate time of the onset; yield 24+13=37 features.

Sound Level Before Onset:

For modelling of an audible aspiration (which according to the target behavior of fluency shaping should be avoided), the sound level before the onset is characterized (intervals: 100 ms before onset or up to 200 ms (depends on available time before onset); normalization as for sound level of the direct onset; yield 2×6=12 features).

Spectrum Before Onset:

For the same purpose, energies of the mel frequency bands are added before onset (two intervals as above; normalization; all voiced segments, or average value of the first 50, 100, or 200 ms after onset; yield 2×4×24=192 features).

3. Classification

The mapping of the 908-dimensional feature vector onto the target class (e.g. gentle/hard onset) is implemented using support-vector machines. This data-driven process is distinguished by its excellent performance even with high-dimensional input data. To solve a multi-class problem with this binary classification method, the scheme "one-against-therest" is applied. All features are initially normalized to a standard deviation of 1; then the average Euclidian length of a feature vector is normalized to 1. In this way, the metaparameter C can be selected very easily (constant to C=0.001). A linear kernel function is used. For precise assessment of class probabilities, the outputs of the decision functions are suitably transformed.

The basis of the support-vector machines is the solution of a non-linear optimization problem; they are distinguished in the application by special robustness in the classification. Input data are the annotation and features of the training speakers. Through the utilized linear kernel function, the classification phase is a simple affine linear function of the features. Standard program libraries are used for the calculation.

The results are transformed for the purpose of estimating probabilities by means of a sigmoid function, see http://scikit-learn.org/stable/modules/calibration.html. Here again standard program libraries are used for calculation.

4. Data

During regular courses of the KST, speech recordings of stutterers were collected. The speakers were to speak various exercises: sustained vowels, individual syllables, one-, two-, and three-syllable words, and finally, short and long sentences. Affordable headsets were used for digitalization.

There are 3,586 recordings of 16 female and 49 male speakers amounting to a total of 5.0 hours. All speakers are native German speakers.

4.1. Annotation

The material was annotated by five therapists with regard to how well different aspects of the target behavior in fluency shaping were realized in each case. Of interest here are only the annotations about the voice onset, which in each case was assessed as "good" (i.e. gentle), "hard," "aspirated," "creaky," or "afflicted with glottal stop." The material was presented in random order; per recording, on average there are annotations from 2.8 therapists (i.e. not every therapist assessed all recordings).

4.1.1. Inter-Rater Agreement

To assess how well the criteria were defined (or the difficulty of the annotation task), it was considered how well the annotations of the individual therapists agreed with one another. Paired agreement was assessed, i.e. in each case one therapist was compared with another. Here it should be noted that this is a pessimistic estimate of the quality, as partly, correct answers of the first annotator are counted as errors due to erroneous annotation by the second annotator.

Table 1 shows the confusion matrix for vowel onsets. The recognition of the individual error types can be characterized also using hit rates and false alarms. These are summarized in Table 2. In sum, it can be said that the criteria appear to be well defined throughout, as the agreement is highly significant. For example, the hit rate for "not gentle versus gentle" is 71.5% with 22.7 false alarms (see Table 2), much higher than the random agreement to be expected here of 22.7%.

TABLE 1

Confusion matrix for annotation of vowel onsets with paired comparison of therapists. Since each of the 1,472 onsets is counted twice, there are a total of 1,638 + 470 + 203 + 565 + 68 = 2,944 = 1,472 × 2 cases.

| Anno-tator 1 | # Cases | Annotator 2 [%] | | | | |
| --- | --- | --- | --- | --- | --- | --- |
| | | gentle | hard | aspirated | creaky | glottal stop |
| gentle | 1,638 | 77.3 | 7.1 | 6.6 | 6.9 | 2.1 |
| hard | 470 | 24.7 | 37.4 | 2.6 | 31.1 | 4.0 |
| aspirated | 203 | 53.2 | 5.9 | 28.6 | 10.8 | 1.5 |
| creaky | 565 | 20.0 | 26.0 | 3.9 | 49.6 | 0.5 |
| glottal stop | 68 | 51.5 | 27.9 | 4.4 | 4.4 | 11.8 |

TABLE 2

Hit rate/false alarm in % for recognition of different error types at voice onset (vowel onsets, paired comparison of therapists).

| | not gentle | hard | aspirated | creaky | glottal stop |
| --- | --- | --- | --- | --- | --- |
| vs. gentle | 71.5 @ 22.7 | 37.4 @ 7.1 | 28.6 @ 6.6 | 49.6 @ 6.9 | 11.8 @ 2.1 |

4.2. Acted (Prototypical) Data

In addition, the therapists (six female, one male speaker; all native German speakers) spoke some of the material in two variants, once in normal speech, and once in the connected, gentle speech technique of fluency shaping. Here there are 5,338 recordings amounting to a total of 4.7 hours.

Under the simplified assumption that in this way the corresponding hard and gentle voice onsets were generated, there was no annotation of this part of the material. This was confirmed by some checks on a random basis at least for voice onsets with vowels. In contrast to the above data from stutterers, where there are many borderline cases, this acted material contains only clear, prototypical realizations of either "gentle" or "hard" voice onsets.

5. Experiment and Results

The reliability to be expected from an automatic system for classification of voice onsets was assessed experimentally. Toward this end, in each case training was done with some of the speakers, and testing with the rest of the speakers (i.e. the parameters of the classification system are estimated using the annotated speakers in the training set, and the accuracy is measured using the annotated speakers in the test set). Altogether, a conservative estimate of the accuracy of the final system is obtained, which is constructed with the data of all speakers. A two-fold cross-validation is used; the results are averaged over 10 runs with different sorting of training and test speakers. During training, an internal cross validation is used (again speaker independent, again two folds) for calibration of probabilities. If there are several annotations for one onset, all are used concurrently (both in training and in testing). In this way, the resultant accuracy is directly comparable to the inter-rater agreement from section 4.1.1 and likewise pessimistic (because in part the errors of therapists are counted as alleged errors of the system).

Only vowel onsets are evaluated. Only recordings are evaluated in which the number of automatically segmented phrases (see Section 1) agrees with the annotation of the therapists. (Reason: for cost efficacy, manual segmentation of the material was dispensed with; by means of the described approach, an approximate, simple assignment of the automatically and manually segmented phrases is possible through the index of the respective phrase.) The classification system provides probabilities for the different voice onsets. Depending on the chosen probability threshold for reporting a pronunciation error, a stricter system (with higher hit rate but also higher false alarm rate) or a more cautious system (lower hit rate but also fewer false alarms) results. This can be illustrated in a so-called Receiver-Operating-Characteristic-Curve (ROC-curve).

5.1. Inadequacy of Sound Level

So as to verify the hypothesis of inadequacy of using solely the sound level as the classification criterion for evaluating voice onsets, in particular for their classification as "gentle," the reliability of the classification system when using the different subsets of the features from Section 2.2 was examined.

Sound level curve: amplitude, local amplitude, sound level of onset, sound level of direct onset and sound level rise (102 features); fundamental frequency/harmonic multiple (216 features); Remainder: noise, sound level drop; fundamental frequency, variability of sound level, variability of voiced/voiceless, harmonicity, spectral features 1-3, sound level before onset and spectrum before onset (590 features).

Figure 3A:
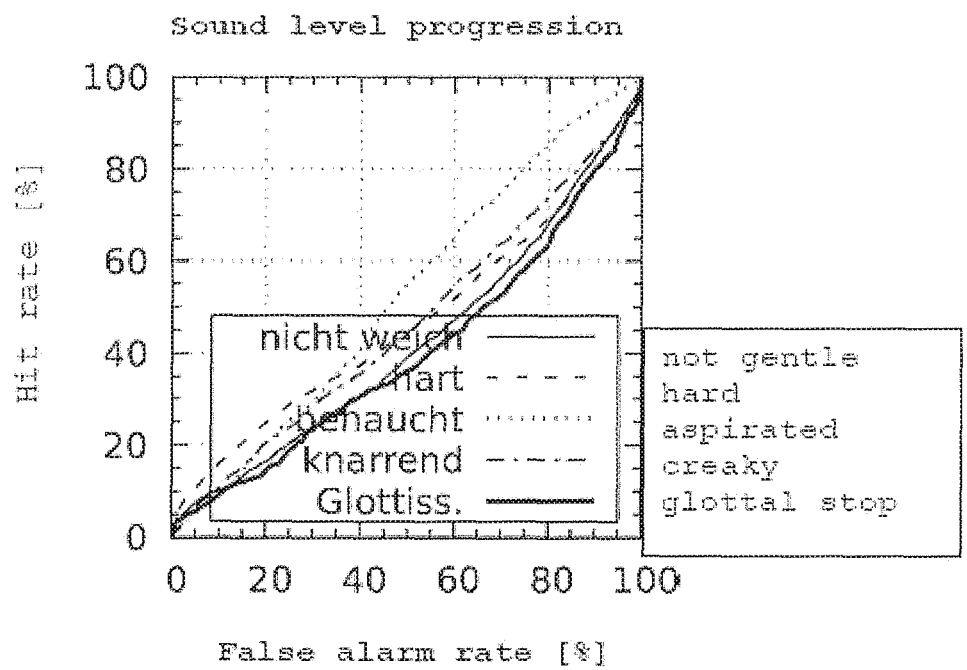
FIGS. 3a-c each show a receiver-operator characteristic curve for identifying various error types versus gentle onsets of a method operating in accordance with an automated software controlled system for different subsets of features. (The further the curve runs leftward and up the better. The first angle by sector (false alarm=hit ratio) corresponds to the random baseline.) The depiction in FIG. 3a shows an assessment made purely from the sound level, as is the case in the prior art. The depiction in FIG. 3b shows an assessment limited to the inventive analysis to be provided in any case of the energy ratio of the fundamental frequency to the harmonic multiple/multiples
Figure 3B:
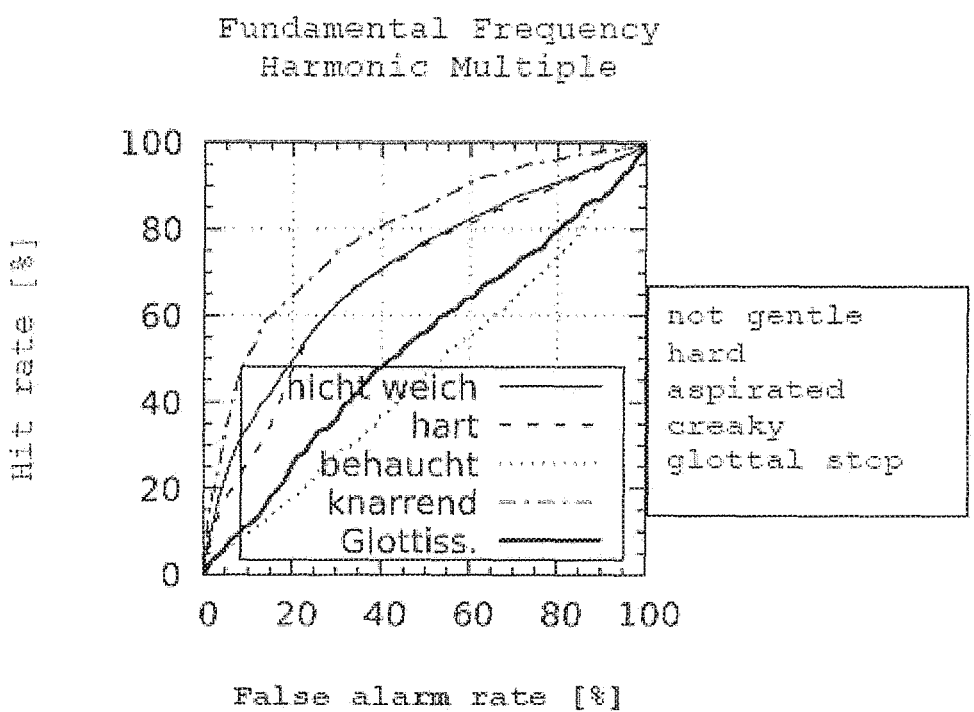
Figure 3C:
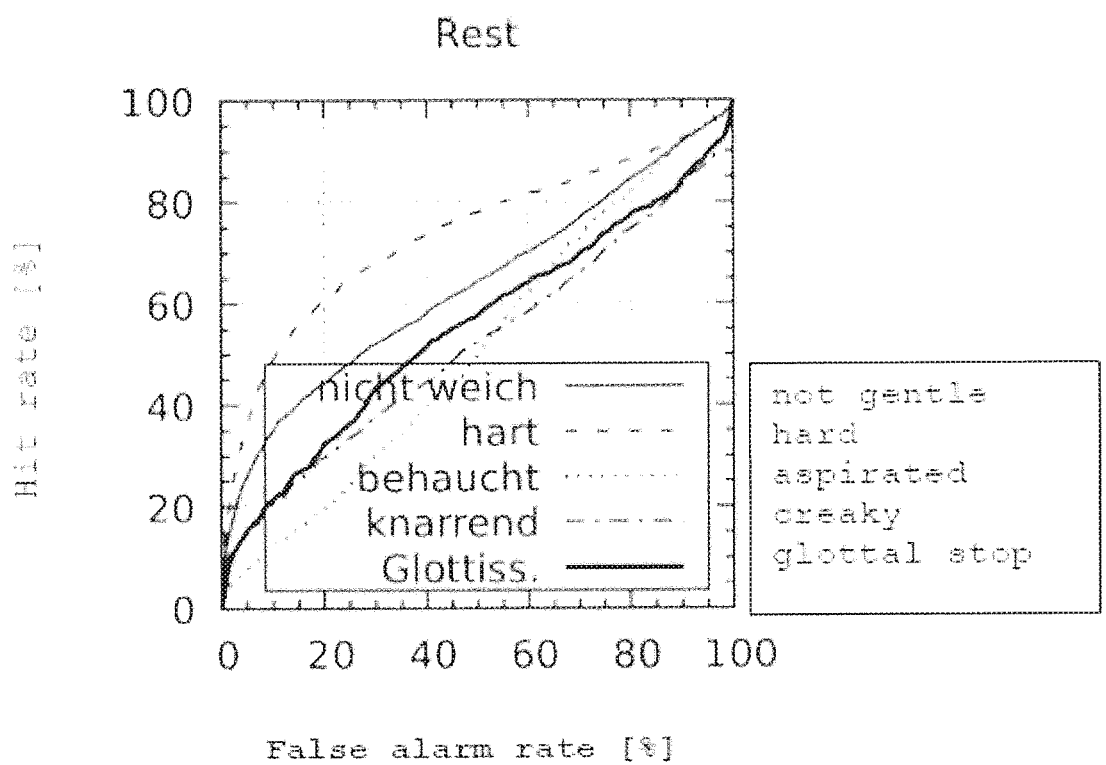

The results may be found in FIG. 3 in the illustrations a to c. For features based solely on the sound level curve, there is not a good detection performance: for example, the area under the curve (AUC) for "gentle" versus "not gentle" at 0.424 is even smaller than the value of the random baseline of 0.5.

The fact that this is not based perhaps on a different calculation of the sound level parameters, but on the difficulty of the problem, is shown by experiments with the prototypical recordings of the therapists (Section 4.2): If the system is tested on these, the results even with the sound level are very good. For example, for "gentle" versus "not gentle" an AUC of 0.906 is obtained (with all features an even better score of 0.973 results).

Figure 4:
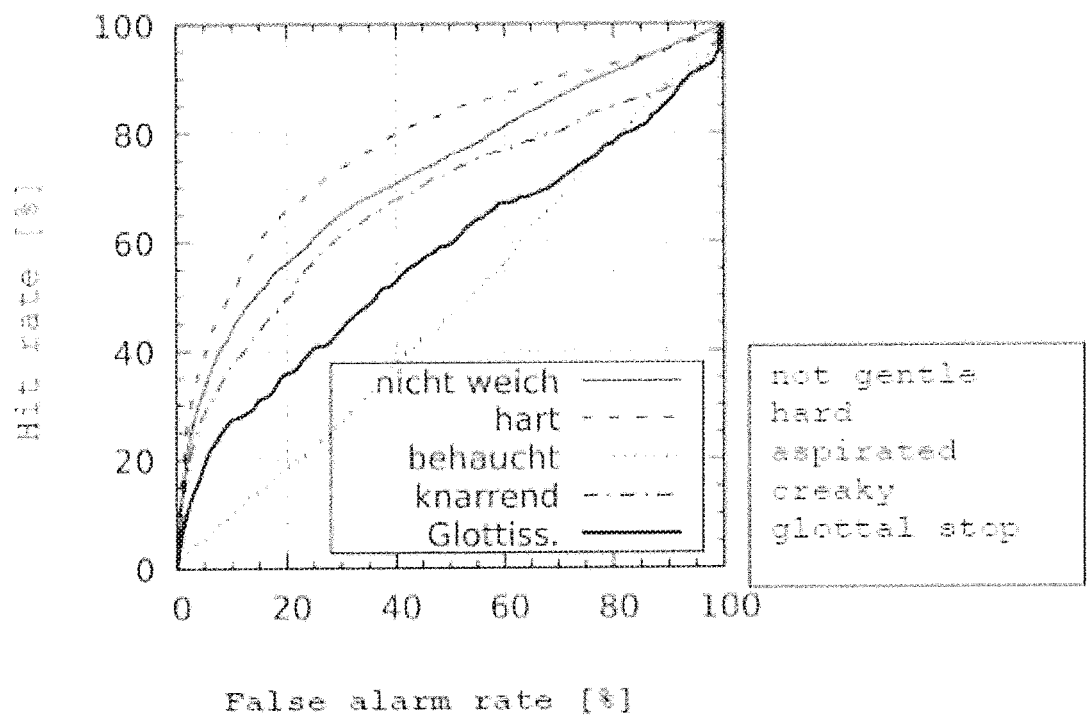
FIG. 4 shows a receiver-operator-characteristic curve for identifying various error types versus gentle onsets based on a version of the method according to the invention in which the comparison of the energies at fundamental frequency/harmonic multiple has been supplemented to assess further parameters identifying a gentle voice onset (to be precise, the union of the subsets of features considered in FIG. 3a-c is used). AUC: 0.725; 0.780; 0.481; 0.675; 0.573.

Only when the further features are used, good results are obtained on the realistic data of stutterers, too. It should be noted here (see FIG. 3b) that the analyses based on the fundamental frequency or harmonic multiples, according to the invention at any rate to be used, are especially suited for identification of creaky onsets, and the rest (see FIG. 3c) for recognition of hard onsets. It should also be recognized, however, that already a reduction of the considered parameters to the energy values according to invention of fundamental frequency and harmonic multiples at voice onset result in a significant improvement, in comparison with sound level-only consideration, in the identification performance of a method carried out with these parameters and guidelines. The advantages of the respective parameter groups combine in the system with all features (see FIG. 4).

It could thus be shown that the pattern recognition system recommended with the invention achieves reliable recognition of gentle/not-gentle voice onsets, which can be used for example for the stuttering therapy in accordance with fluency shaping. This also applies for the application under realistic conditions. It was shown that previous approaches (as for instance U.S. Pat. No. 4,020,567) do not achieve this (but do it only for clearly pronounced, prototypical data, which are unrealistic for application). The reliability of the system is in the same magnitude as that of a therapist. For example, for the distinguishing of "gentle" vs. "not-gentle," with 22.7% false alarms there is a hit rate of 58.5% for the system, while a therapist on average achieves 71.5%.

Figure 5:
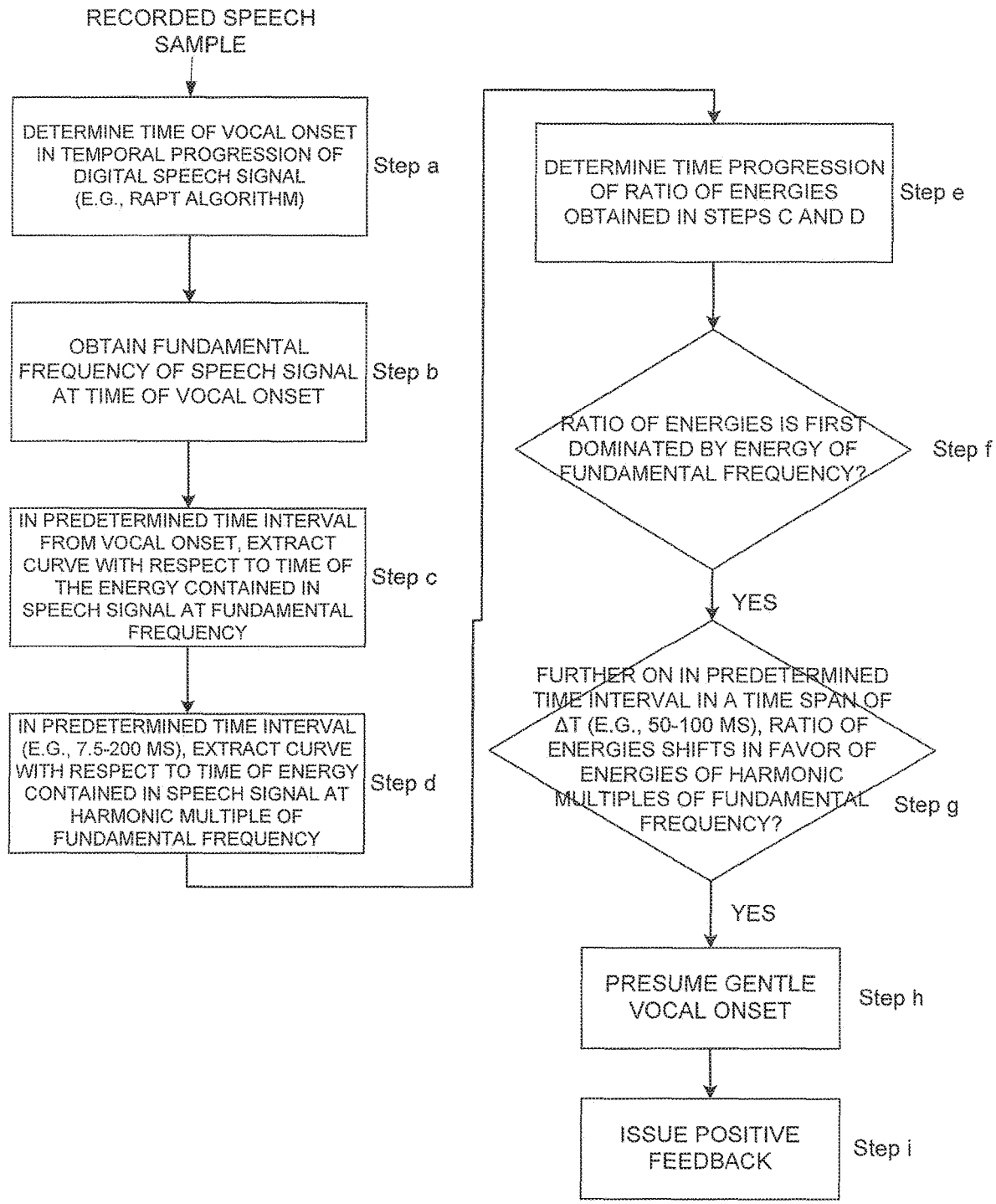
FIG. 5 is a flowchart of an embodiment of the inventive method for treating a stutterer.
Figure 6:
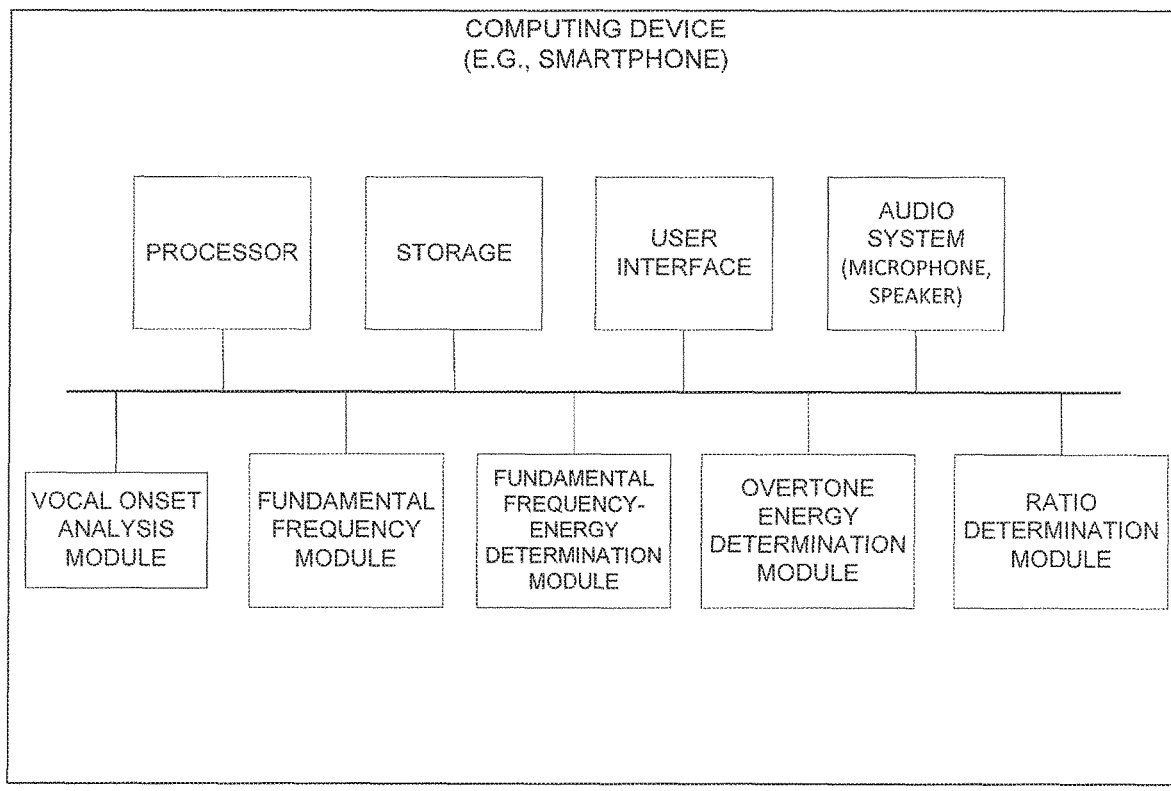
FIG. 6 is a schematic illustration of a computing device configured to treat a stutterer in accordance with the inventive method.

FIG. 5 is a flowchart of an embodiment of the inventive method for treating a stutterer, and FIG. 6 is a schematic illustration of a computing device configured to treat a stutterer. In the method of FIG. 5, a recorded speech sample is input to the analysis steps, which are denoted as steps a through h. These steps have been described above and we will not repeat the description here. At step i, positive feedback is issued to the patient/subject if a gentle voice onset is identified, i. e., as determined in steps f, g, and h. What is not shown in FIG. 5 is that negative feedback is issued in the event that gentle voice onset is not identified, based on the outcome of steps f and g. As shown in FIG. 6, an embodiment of a computing device, such as a smartphone, tablet, or other form of computing device, configured in accordance with the present invention includes a processor, storage, user interface, and audio system including at least a microphone and a speaker. In addition, a number of software-based modules are included. These include a voice onset analysis module, a fundamental frequency module, a fundamental frequency-energy determination module, and overtone energy determination module, and a ratio determination module. These modules include executable instructions which cause the computing device to carry out the inventive method described above.

We claim:

1. A method for evaluating a quality of a voice onset of a speaker, wherein an acoustic speech signal of the speaker is recorded and converted into a digital speech signal, wherein the digital speech signal is analyzed in its temporal progression in order to
   a. determine a time of voice onset of the speaker in the temporal progression of the digital speech signal;
   b. determine a fundamental frequency of the speech signal at the time of voice onset being a frequency between 50 and 500 Hz;
   c. from the digital speech signal, in a predetermined time interval from the time of voice onset, extract the curve with respect to time of the energy contained in the speech signal at the fundamental frequency;
   d. from the digital speech signal, in a predetermined time interval from the time of voice onset, extract the curve with respect to time of the energy contained in the speech signal at at least one harmonic multiple of the fundamental frequency;
   e. determine the time progression of the ratio of the energies obtained in steps c and d;
   wherein a gentle voice onset is presumed if in the predetermined time interval the ratio of energies obtained in step e. is first dominated by the energy of the fundamental frequency within a first period of the predetermined time interval, and only if further on in the predetermined time interval following the first period of the predetermined time interval dominated by the energy of the fundamental frequency in a time span of Δt the ratio of energies obtained in step e. shifts in favor of the energies of the harmonic multiples of the fundamental frequency.

2. The method according to claim 1, characterized in that for determination of the time of voice onset in step a., a Robust Algorithm for Pitch Tracking (RAPT) is used.

3. The method according to claim 1, characterized in that the predetermined time interval has a length of 7.5 to 200 ms.

4. The method according to claim 3, characterized in that a timespan Δt of between 50 and 100 ms is assessed as the criterion for a gentle voice onset.

5. The method according to claim 1, characterized in that along with an analysis of the ratio of energies obtained in step e., further parameters derived from the digital speech signal are used to determine whether there is a gentle voice onset.

6. A data processing program stored on a non-transitory computer readable medium for computerized, automated evaluation of a quality of a voice onset of a speaker, with
a. a voice onset analysis module, which is aimed at determining the time of voice onset of the speaker from a temporal progression of a digital speech signal obtained from an acoustic speech signal of the speaker;
b. a fundamental frequency module, which is aimed at determining a fundamental frequency of the speech signal at the time of voice onset at a frequency between 50 to 500 Hz;
c. a fundamental frequency-energy determination module, which is aimed at determining the curve with respect to time of the energy contained in the speech signal at the fundamental frequency from the digital speech signal in a predetermined time interval from the time of voice onset;
d. an overtone energy determination module, which is aimed at determining the curve with respect to time of the energy contained in the speech signal at harmonic multiples of the fundamental frequency from the digital speech signal in the predetermined time interval;
e. a ratio determination module, which is aimed at determining the temporal progression of the ratio of the energies obtained from the fundamental frequency-energy determination module and from the overtone-energy determination module, and to presume a gentle voice onset if in the predetermined time interval the ratio of the energies is initially, within a first period of the predetermined time interval, dominated by the energy of the fundamental frequency, and only in the further course of the predetermined time interval, following the first period, the ratio of the energies shifts in favor of the energies of the harmonic multiples of the fundamental frequency.

7. The data processing program according to claim 6, characterized in that it further has a digitalization module for producing the digital speech signal from the acoustic speech signal.

8. The data processing program according to one of claim 6 or 7, characterized in that the voice onset analysis module uses a RAPT algorithm for determining the time of voice onset.

9. The data processing program according to claim 6, characterized in that it is configured as application software for a mobile terminal device, in particular a smartphone or a tablet computer.

10. A computerized data processing device, characterized in that it contains the data processing program in accordance with claim 6.

11. The computerized data processing device according to claim 10, characterized in that it has an input for receiving an acoustic speech signal.

12. The computerized data processing device in accordance with claim 11, characterized in that it is configured as a mobile terminal device.

13. A method for treating persons with speech disorders, in particular stutterers, with the following steps:
a. inviting a person to be treated to provide a speech sample;
b. recording of the speech sample provided by the person to be treated as an acoustic speech signal with a recording device;
c. conversion of the received speech signal into a digital speech signal;
d. analysis of the digital speech signal in its temporal progression, wherein
 i. in the temporal progression of the digital speech signal, a time of voice onset of the speaker is determined,
 ii. a fundamental frequency of the speech signal at the time of the voice onset is determined,
 iii. from the digital speech signal, in a predetermined time interval, the curve with respect to time of the energy contained in the speech signal is determined from the time of voice onset,
 iv. from the digital speech signal, in the predetermined time interval, the curve with respect to time of the energy contained in the speech signal is determined at at least one harmonic multiple of the fundamental frequency,
 v. the temporal progression of the ratio of the energies obtained in steps iii. and iv. is determined,
 vi. wherein a gentle voice onset is presumed if in the predetermined time interval the ratio of the energies obtained in accordance with the above step v. is initially dominated by the energy of the fundamental frequency within a first period of the predetermined time interval and only in the further course of the predetermined time interval following the first period in a time span Δt the ratio of energies shifts in favor of the energy/energies of the harmonic multiple(s) of the fundamental frequency;
e. issuance of positive feedback to the person to be treated if a gentle voice onset has been identified and issuance of negative feedback to the person to be treated if no gentle voice onset was identified.

14. The method according to claim 13, characterized in that a RAPT algorithm is used for determining the time of voice onset in step d.i.

15. The method according to claim 13, characterized in that the predetermined time interval has a length of from 7.5 to 200 ms, in particular 50 to 100 ms.

16. The method according to claim 13, characterized in that a time span Δt of between 50 and 100 ms is taken as the criterion for a gentle voice onset.

17. The method according to claim 13, characterized in that along with an analysis of the energy ratio obtained in step d.v., other parameters derived from the digital speech signal are used in order to determine whether there is a gentle voice onset.

18. The method according to claim 13, characterized in that the recording device is a smartphone or tablet computer or a recording device connected to such a smartphone or tablet computer, wherein the steps a. and d. to e. are also carried out in the smartphone or tablet computer using the appropriately programmed software, wherein step c. is also carried out in the smartphone or tablet computer or in the recording device connected to the smartphone or tablet computer.

19. The method according to claim 13, characterized in that the person to be treated is repeatedly invited to provide a speech sample.

20. The method according to claim 13, characterized in that the results of analyses of these speech samples are recorded and graphically displayed to the person to be treated.

21. The method according to claim 13, characterized in that the results of the analysis are transmitted to a central evaluating office.

22. The method according to claim 21, characterized in that the central evaluating office provides responses to the person to be treated regarding treatment progress and/or instructions for a treatment action.

23. The method according to claim 1, wherein a support-vector machine is used for classification.

24. The data processing program according to claim 6, further comprising a support-vector machine for classification.

25. The method according to claim 13, wherein a support-vector machine is used for classification.

* * * * *